US011546485B2

(12) United States Patent
Nakaminato et al.

(10) Patent No.: US 11,546,485 B2
(45) Date of Patent: Jan. 3, 2023

(54) INFORMATION PROCESSING APPARATUS AND SEMICONDUCTOR DEVICE

(71) Applicant: FUJIFILM Business Innovation Corp., Tokyo (JP)

(72) Inventors: Tsutomu Nakaminato, Kanagawa (JP); Yuya Hirayama, Kanagawa (JP); Kenji Kuroishi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 610 days.

(21) Appl. No.: 16/553,147

(22) Filed: Aug. 27, 2019

(65) Prior Publication Data

US 2020/0288038 A1 Sep. 10, 2020

(30) Foreign Application Priority Data

Mar. 5, 2019 (JP) .............................. JP2019-039681

(51) Int. Cl.
*G06F 13/12* (2006.01)
*H04N 1/32* (2006.01)

(52) U.S. Cl.
CPC ......... *H04N 1/32598* (2013.01); *G06F 13/12* (2013.01); *H04N 1/32587* (2013.01); *H04N 2201/0081* (2013.01); *H04N 2201/0086* (2013.01)

(58) Field of Classification Search
None
See application file for complete search history.

(56) References Cited

U.S. PATENT DOCUMENTS

| 8,271,712 | B2 | 9/2012 | Asada et al. |
| 10,108,567 | B2* | 10/2018 | Liu ..................... G06F 13/4022 |
| 2010/0262966 | A1* | 10/2010 | Dow ....................... G06F 1/329 |
| | | | 718/102 |
| 2012/0185623 | A1* | 7/2012 | Ross ..................... G06F 13/362 |
| | | | 710/63 |
| 2019/0130523 | A1* | 5/2019 | Nudejima ............. G06F 3/1215 |

FOREIGN PATENT DOCUMENTS

| JP | 2004170475 | 6/2004 |
| JP | 2011086990 | 4/2011 |

* cited by examiner

*Primary Examiner* — Craig C Dorais
(74) *Attorney, Agent, or Firm* — JCIPRNET

(57) ABSTRACT

An information processing apparatus includes a first integrated circuit including a first controller that processes data acquired from a device and that controls an operation of the device; a second integrated circuit including a second controller with a higher processing speed than a processing speed of the first controller; and a third integrated circuit including a first connection unit connectable to the device. The third integrated circuit includes a second connection unit connectable to the first integrated circuit, a third connection unit connectable to the second integrated circuit, and a setting unit that, when the device is connected to the first connection unit, sets an integrated circuit to be connected, in accordance with a communication speed of the connected device.

10 Claims, 10 Drawing Sheets

FIG. 5

| COMMUNICATION STANDARD | COMMUNICATION SPEED (Gbps) | LINK-UP TARGET |
|---|---|---|
| USB1.0 | 0.012 | MFP CPU |
| USB1.1 | 0.012 | MFP CPU |
| USB2.0 | 0.48 | MFP CPU |
| USB3.0 | 5 | MAIN CPU |
| USB3.1 | 10 | MAIN CPU |
| USB3.2 | 20 | MAIN CPU |
| 10BASE-T | 0.01 | MFP CPU |
| 100BASE-TX | 0.1 | MFP CPU |
| 1000BASE-T | 1 | MAIN CPU |
| 10GBASE-T | 10 | MAIN CPU |
| IEEE802.11a | 0.054 | MFP CPU |
| IEEE802.11ac | 6.93 | MAIN CPU |

INFORMATION PROCESSING APPARATUS AND SEMICONDUCTOR DEVICE

CROSS-REFERENCE TO RELATED APPLICATIONS

This application is based on and claims priority under 35 USC 119 from Japanese Patent Application No. 2019-039681 filed Mar. 5, 2019.

BACKGROUND

(i) Technical Field

The present disclosure relates to an information processing apparatus and a semiconductor device.

(ii) Related Art

An information processing apparatus may be provided with a first integrated circuit having a first controller that controls the operation of a device (for example, see Japanese Unexamined Patent Application Publication No. 2004-170475). When a device is connected to the information processing apparatus, the first controller is connected to the device, acquires data from the device, and performs processing on the data. The information processing apparatus may be also provided with a second integrated circuit having a second controller with a higher processing speed than that of the first controller. For example, the second controller acquires data from the device connected to the information processing apparatus, and performs processing on the data or other processing.

In a case where plural integrated circuits having at least the first integrated circuit and the second integrated circuit are provided in the information processing apparatus, when a device is connected to the information processing apparatus, control may be performed to set the controller to be connected to the device, to the second controller.

SUMMARY

In the case where the plural integrated circuits are provided in the information processing apparatus, when the second controller with a high processing speed is used for all the processing on the data acquired from the device connected to the information processing apparatus, the other processing that is performed by the second controller may be disturbed.

Aspects of non-limiting embodiments of the present disclosure relate to suppressing disturbance of the other processing that is performed by the second controller, as compared with the case where the second controller is used for all the processing on the data acquired from the connected device.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a first integrated circuit including a first controller that processes data acquired from a device and that controls an operation of the device; a second integrated circuit including a second controller with a higher processing speed than a processing speed of the first controller; and a third integrated circuit including a first connection unit connectable to the device. The third integrated circuit includes a second connection unit connectable to the first integrated circuit, a third connection unit connectable to the second integrated circuit, and a setting unit that, when the device is connected to the first connection unit, sets an integrated circuit to be connected, in accordance with a communication speed of the connected device.

BRIEF DESCRIPTION OF THE DRAWINGS

An exemplary embodiment of the present disclosure will be described in detail based on the following figures, wherein:

FIG. 5 illustrates a configuration example of a connection management table;

DETAILED DESCRIPTION

An exemplary embodiment of the present disclosure is described below in detail with reference to the accompanying drawings.

For example, an image forming apparatus is described now. The image forming apparatus described in this exemplary embodiment is an apparatus that forms an image on a sheet, and has a copy function, a scan function, a facsimile transmission/reception function, and a print function.

The apparatus is not limited to the image forming apparatus having all the functions, and may be an apparatus specific to one of the functions, for example, a copier, a scanner (including three-dimensional scanner), a facsimile transmitter/receiver, or a printer (including three-dimensional printer).

General Configuration of Image Forming Apparatus

Figure 1:
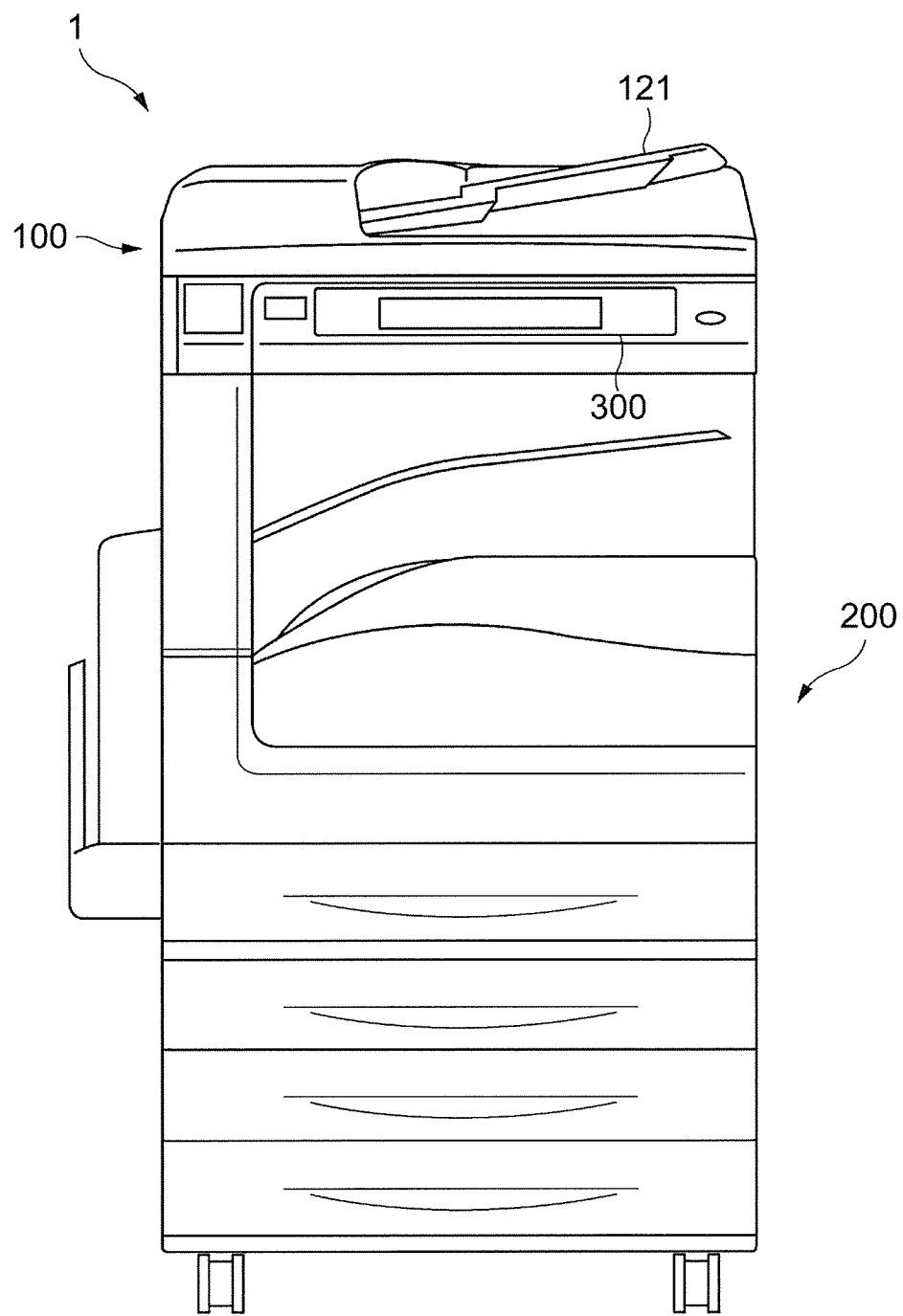
FIG. 1 is an external view of an image forming apparatus according to this exemplary embodiment.
Figure 2:
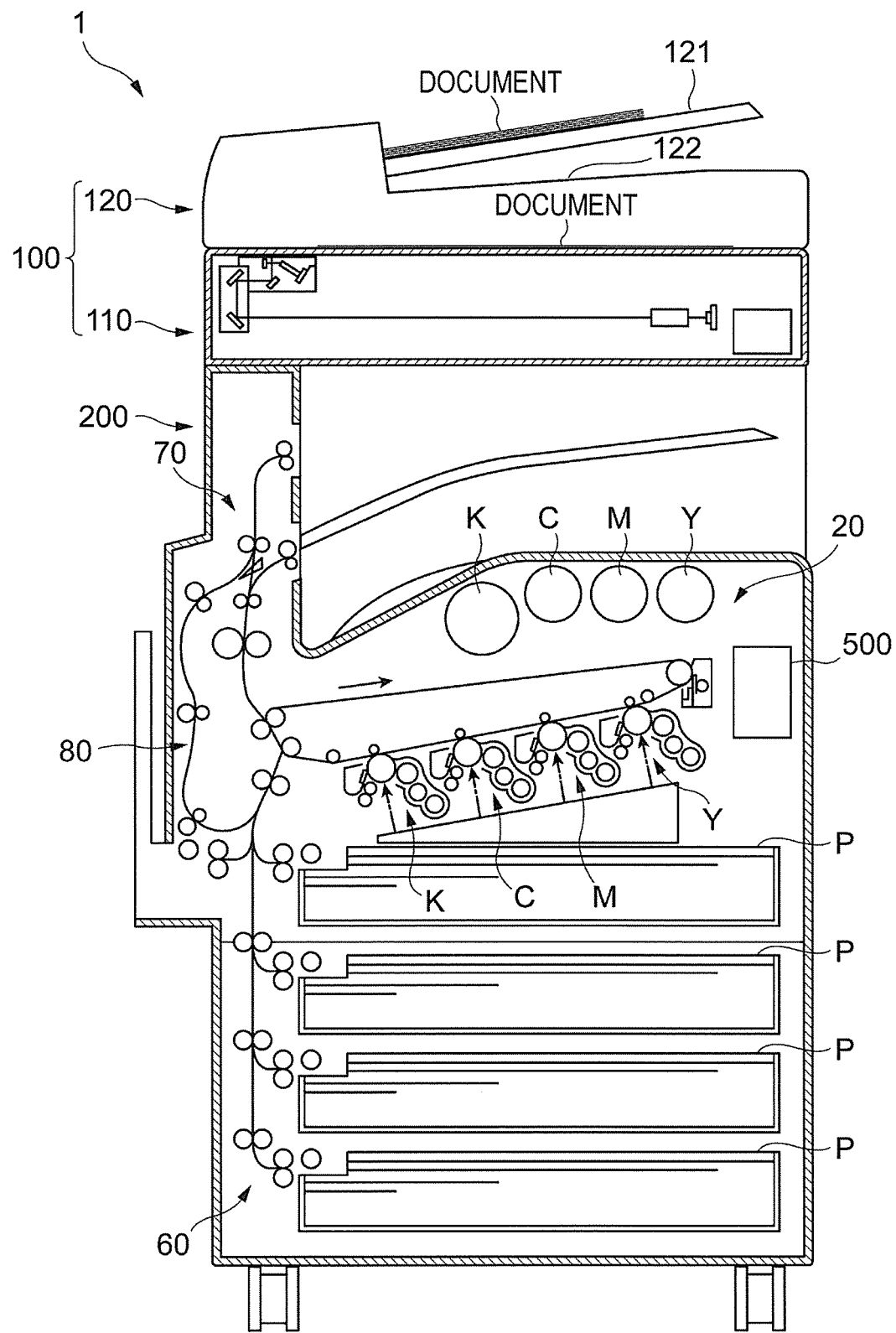
FIG. 2 illustrates the internal structure of the image forming apparatus according to this exemplary embodiment.

FIG. 1 is an external view of an image forming apparatus 1 according to this exemplary embodiment. FIG. 2 illustrates the internal structure of the image forming apparatus 1 according to this exemplary embodiment.

The image forming apparatus 1 includes an image reading device 100 that reads an image of a document, and an image recording device 200 that records an image on a sheet.

The image forming apparatus 1 also includes a user interface (UI) 300 that is used for reception of an operation by a user and presentation of various types of information to the user.

The image forming apparatus 1 further includes a control device 500 that controls the entire operation of the image forming apparatus 1.

The image forming apparatus 1 is an example of an information processing apparatus. The control device 500 is also an example of an information processing apparatus.

The image reading device 100 is mounted on or above the image recording device 200. The image reading device 100 optically reads an image of a document.

The image recording device 200 is constituted of an engine that is used for forming an image and a mechanism that is used for transporting a sheet. The control device 500 is disposed in the image recording device 200.

A user interface 300 is disposed at a front side of the image reading device 100 so that the operation surface thereof faces a user who operates the image forming apparatus 1.

The image reading device 100 includes an image reading unit 110 that reads an image of a document, and a document transport unit 120 that transports a document to the image reading unit 110. The document transport unit 120 is disposed at an upper section of the image reading device 100. The image reading unit 110 is disposed at a lower section of the image reading device 100.

The document transport unit 120 has a document housing portion 121 that houses a document, and a document output portion 122 to which the document pulled out form the document housing portion 121 is output. The document transport unit 120 transports a document from the document housing portion 121 to the document output portion 122 by using a transport mechanism (not illustrated).

The document transport unit 120 is also called auto document feeder (ADF).

Alternatively, a reading optical system may be moved relative to a document and may read an image of the document.

The image recording device 200 includes an image forming unit 20 that forms an image on a sheet P pulled out from a sheet tray, a sheet supply unit 60 that supplies the sheet P to the image forming unit 20, a sheet output unit 70 that outputs the sheet P on which an image has been formed by the image forming unit 20, and a reverse transport unit 80 that reverses the front and back of the sheet P output from the image forming unit 20, and that transports again the sheet P to the image forming unit 20.

The configurations of these units are known and hence their detailed description is omitted. In the image forming unit 20, recording units corresponding to respective colors of black (K), cyan (C), magenta (M), and yellow (Y) are disposed along a transport path of a sheet P. The types of colors and the combination of colors are examples.

The user interface 300 is constituted of a reception device that receives an instruction from a user, and an output device that provides information to the user. Specifically, the user interface 300 includes an operation receiving unit and a display.

The operation receiving unit provides, for example, a function of detecting an operation on a hardware key, and a function of detecting an operation on a software key. The display displays, for example, a window for providing information and a software key.

Connection Configuration among Functional Modules

Figure 3:
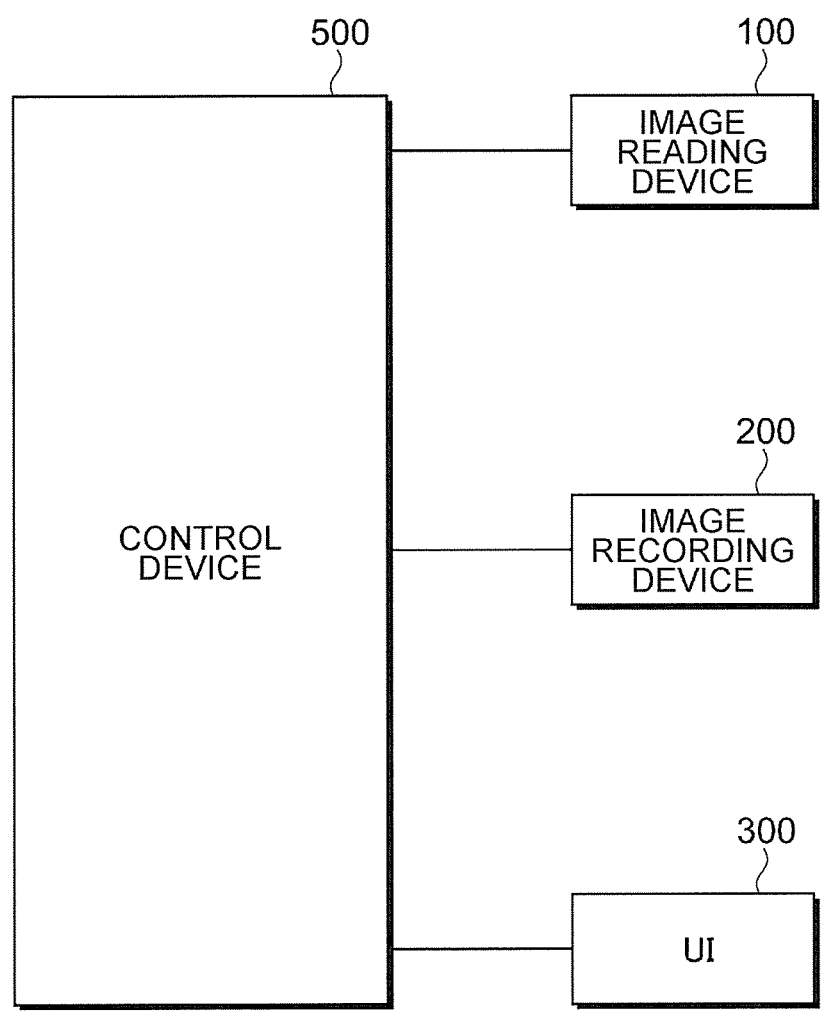
FIG. 3 is an explanatory view of an example of a connection configuration among functional modules such as a control device that constitutes the image forming apparatus.

FIG. 3 is an explanatory view of an example of a connection configuration among functional modules such as the control device 500 that constitutes the image forming apparatus 1.

The image reading device 100, the image recording device 200, and the user interface 300 are connected to the control device 500. The image reading device 100, the image recording device 200, the user interface 300, and the control device 500 each have a built-in semiconductor chip configured as a functional module.

In this exemplary embodiment, a semiconductor substrate in which plural modular chips (Mochi chips) are integrated is used. A Mochi chip is a semiconductor chip in which only required functions are selectively integrated. It is to be noted that Mochi is a trademark.

The interconnection method between Mochi chips includes a parallel connection method and a serial connection method. In this exemplary embodiment, a serial connection method is employed. That is, in this exemplary embodiment, data between Mochi chips is transferred by a serial transmission method.

Internal Configuration of Control Device

Figure 4:
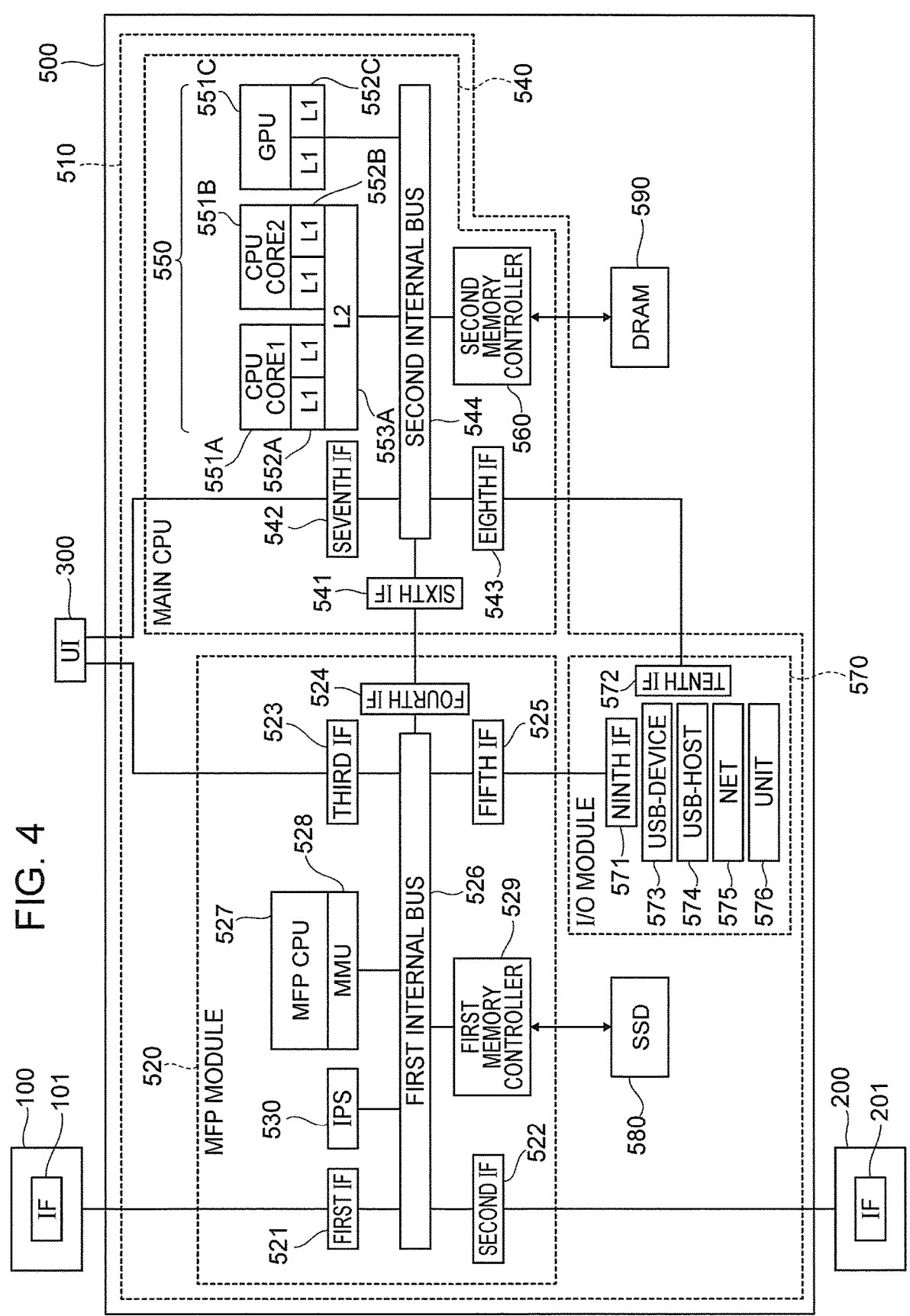
FIG. 4 is an explanatory view of an example of the internal configurations of an image reading device, an image recording device, and a control device.

FIG. 4 is an explanatory view of an example of the internal configurations of the image reading device 100, the image recording device 200, and the control device 500.

The image reading device 100 is provided with a Mochi interface module 101. The Mochi interface module 101 transfers image data of a document to the control device 500.

The image recording device 200 is provided with a Mochi interface module 201. The Mochi interface module 201 receives the image data transferred from the control device 500.

The control device 500 is connected to the image reading device 100, the image recording device 200, and the user interface 300 via an external bus. The control device 500 includes a Mochi chip unit 510, a solid state drive (SSD) 580, and a dynamic random access memory (DRAM) 590. The Mochi chip unit 510 serves as an example of a semiconductor device.

The Mochi chip unit 510 includes a multifunction peripheral (MFP) module chip 520 serving as an example of a first integrated circuit, a Main CPU module chip 540 serving as an example of a second integrated circuit, and an input/output (I/O) module chip 570 serving as an example of a third integrated circuit.

The MFP module chip 520 has a function of controlling the operations of the image reading device 100 and the image recording device 200. The image reading device 100, the image recording device 200, the user interface 300, and the MFP module chip 520 fulfill functions of, for example, a copier, a scanner, a facsimile transmitter/receiver, and a printer provided by the image forming apparatus 1. That is, when the MFP module chip 520 is provided in the control device 500, even if the Main CPU module chip 540 is not provided, the functions as the image forming apparatus 1 are fulfilled.

The MFP module chip 520 includes a MFP CPU 527, a first Mochi interface module 521, a second Mochi interface module 522, a third Mochi interface module 523, a fourth Mochi interface module 524, and a fifth Mochi interface module 525. The MFP module chip 520 also has a first internal bus 526, a memory management unit (MMU) 528, a first memory controller 529, and an intrusion prevention system (IPS) 530.

The MFP CPU 527 serving as an example of a first controller controls the operation of the image forming apparatus 1. When receiving an instruction to read image data, the MFP CPU 527 reads the image data transferred from the image reading device 100 and causes the SSD 580 to store the image data. When receiving an instruction to form an image, the MFP CPU 527 causes the image data to be transferred to the image recording device 200, and causes the image recording device 200 to form an image on a sheet.

In addition, the MFP CPU 527 analyzes the data transferred from the I/O module chip 570. The analysis of data may be, for example, processing of specifying the type of data. The processing of specifying the type of data may be, for example, processing of specifying whether the data transferred from the I/O module chip 570 is image data or data relating to an instruction.

The MFP CPU 527 gives an instruction to transfer the data stored in the SSD 580 to the DRAM 590, to the fourth Mochi interface module 524.

For example, the MFP CPU 527 may have an operating frequency of 0.66 MHz.

In this exemplary embodiment, in a case where a device with a communication speed of 1 Gbps is connected to the I/O module chip 570, the period from when the device transmits data to when the I/O module chip 570 receives the data is shorter than the period from when the I/O module chip 570 receives the data to when the data is analyzed by the MFP CPU 527 and written in the SSD 580.

The first Mochi interface module 521 receives the data transferred from the image reading device 100.

The second Mochi interface module 522 transfers data to the image recording device 200.

The third Mochi interface module 523 transfers data to the user interface 300. The data transferred from the third Mochi interface module 523 is displayed on the display of the user interface 300. While the data transferred from the Main CPU module chip 540 is displayed on the display of the user interface 300, data is not transferred from the third Mochi interface module 523 to the user interface 300.

The fourth Mochi interface module 524 serving as an example of a fourth connection unit transmits and receives data to and from the Main CPU module chip 540.

The fifth Mochi interface module 525 receives the data transferred from the I/O module chip 570.

The first internal bus 526 transfers packet data with a predetermined size (for example 64 bytes). The first internal bus 526 connects the first Mochi interface module 521, the second Mochi interface module 522, the third Mochi interface module 523, the fourth Mochi interface module 524, the fifth Mochi interface module 525, the memory management unit 528, the first memory controller 529, and the intrusion prevention system 530 to one another, and is used for transmission and reception of packet data.

In this exemplary embodiment, data in the Mochi chip unit 510 is transferred on a packet data basis.

The memory management unit 528 manages address information corresponding to data stored in the MFP CPU 527.

The first memory controller 529 serving as an example of a first writing unit is a circuit that controls writing of data into the SSD 580, reading data from the SSD 580, and refreshment of the SSD 580. The first memory controller 529 is connected to the first internal bus 526, and receives and transmits packet data from and to another device that is connected to the first internal bus 526. For example, the first memory controller 529 executes reading and writing of data in response to a request from the MFP CPU 527.

The intrusion prevention system 530 monitors the data passing through the first internal bus 526, and prevents an unauthorized access into the MFP module chip 520 from occurring.

The Main CPU module chip 540 has a Main CPU 550, a sixth Mochi interface module 541, a seventh Mochi interface module 542, an eighth Mochi interface module 543, a second internal bus 544, and a second memory controller 560.

The Main CPU 550 analyzes the data transferred from the I/O module chip 570. The analysis of data is similar to the analysis performed by the MFP CPU 527.

The Main CPU 550 gives an instruction to transfer the data stored in the SSD 580 to the DRAM 590 and an instruction to transfer the data stored in the DRAM 590 to the SSD 580, to the sixth Mochi interface module 541.

The Main CPU 550 also performs decompose processing. The decompose processing is processing of converting image data into image data in a sheet output format. The image data in a sheet output format may be, for example, bitmap data.

The Main CPU 550 further performs processing of displaying an image corresponding to the operation received by the operation receiving unit of the user interface 300, on the display of the user interface 300.

The processing speed of the Main CPU 550 is higher than that of the MFP CPU 527. For example, the Main CPU 550 may have an operating frequency of 1.6 GHz.

In this exemplary embodiment, in a case where a device with a communication speed of 1 Gbps is connected to the I/O module chip 570, the period from when the I/O module chip 570 receives data to when the data is analyzed by the Main CPU 550 and written in the DRAM 590 is shorter than the period from when the device transmits the data to when the I/O module chip 570 receives the data.

The Main CPU 550 is constituted of a first central processing unit (CPU) core 551A that controls the operation of the entirety of the image forming apparatus 1, a second CPU core 551B that controls the operation of the image reading device 100, and a graphics processing unit (GPU) core 551C that processes an image. That is, the Main CPU 550 has a multi-core configuration.

The first CPU core 551A and the second CPU core 551B each are an example of a second controller. In a broad sense, the Main CPU 550 is also an example of a second controller.

In this exemplary embodiment, the first CPU core 551A and the second CPU core 551B have first cash memories 552A and 552B, and a second cash memory 553A.

The GPU core 551C has a first cash memory 552C.

The sixth Mochi interface module 541 transmits and receives data to and from the fourth Mochi interface module 524 of the MFP module chip 520.

The seventh Mochi interface module 542 transfers data to the user interface 300. The data transferred from the seventh Mochi interface module 542 is displayed on the display of the user interface 300.

The eighth Mochi interface module 543 receives the data transferred from the I/O module chip 570.

The second internal bus 544 connects the Main CPU 550, the sixth Mochi interface module 541, the seventh Mochi interface module 542, the eighth Mochi interface module 543, and the second memory controller 560 to one another, and is used for transmission and reception of packet data.

The second memory controller 560 serving as an example of a second writing unit is a circuit that controls writing of data into the DRAM 590, reading data from the DRAM 590, and refreshment of the DRAM 590. The second memory controller 560 is connected to the second internal bus 544, and receives and transmits packet data from and to another device that is connected to the second internal bus 544.

The I/O module chip 570 is used for receiving data from a device that is connected to the image forming apparatus 1.

The I/O module chip 570 has a connection management unit 576, a ninth Mochi interface module 571, a tenth Mochi interface module 572, a peripheral-device interface unit 573, a USB-memory interface unit 574, and a communication-target interface unit 575.

When a device is connected to the I/O module chip 570, the connection management unit 576 serving as an example of a setting unit determines one of the MFP module chip 520 and the Main CPU module chip 540 to which the device is linked up, in accordance with the communication speed of the connected device. Link-up represents connection in a communication enabled manner. The connection management unit 576 holds, in an associated manner, standard information relating to the standard of communication of a device and connection target information relating to a connection target that is one of the MFP module chip 520 and the Main CPU module chip 540. When standard information is acquired from the device connected to the I/O module chip 570, the connection management unit 576 sets connection to the connection target specified from the connection target information associated with the acquired standard information. In this case, the connection target information serves as circuit information relating to a connectable integrated circuit.

The ninth Mochi interface module 571 serving as an example of a second connection unit is used when setting is made by the connection management unit 576 such that the I/O module chip 570 is linked up to the MFP module chip 520. In this case, the ninth Mochi interface module 571 transfers the data to the MFP module chip 520 from the device connected to the I/O module chip 570.

The tenth Mochi interface module 572 serving as an example of a third connection unit is used when setting is made by the connection management unit 576 such that the I/O module chip 570 is linked up to the Main CPU module chip 540. In this case, the tenth Mochi interface module 572 transfers the data to the Main CPU module chip 540 from the device connected to the I/O module chip 570.

The peripheral-device interface unit 573 is linked up to a terminal apparatus such as a personal computer (PC). When being linked up to the terminal apparatus, the peripheral-device interface unit 573 transmits connection information indicating the link-up to the device, to the connection management unit 576. The peripheral-device interface unit 573 also acquires standard information from the linked-up terminal apparatus, and transfers the acquired standard information to the connection management unit 576. The peripheral-device interface unit 573 transfers image data acquired from the linked-up terminal apparatus to the ninth Mochi interface module 571 or the tenth Mochi interface module 572.

The USB-memory interface unit 574 is linked up to a USB memory. When being linked up to the USB memory, the USB-memory interface unit 574 transmits connection information to the connection management unit 576. The USB-memory interface unit 574 also acquires standard information from the linked-up USB memory, and transfers the acquired standard information to the connection management unit 576. The USB-memory interface unit 574 transfers the image data acquired from the linked-up USB memory to the ninth Mochi interface module 571 or the tenth Mochi interface module 572.

The communication-target interface unit 575 is linked up to a communication target such as a server apparatus. When being linked up to the communication target, the communication-target interface unit 575 transmits connection information to the connection management unit 576. The communication-target interface unit 575 also acquires standard information from the connecting communication target, and transfers the acquired standard information to the connection management unit 576. The communication-target interface unit 575 transfers the image data acquired from the connecting communication target to the ninth Mochi interface module 571 or the tenth Mochi interface module 572.

The peripheral-device interface unit 573, the USB-memory interface unit 574, and the communication-target interface unit 575 each serve as a first connection unit that is connectable to a device.

The SSD 580 serving as an example of a first storage is a semiconductor memory that is a non-volatile storage. For the first storage, for example, an embedded multimedia card (eMMC) may be used.

The DRAM 590 serving as an example of a second storage is a semiconductor memory that is a volatile storage.

Description on Connection Management Table

The data held in the connection management unit 576 is described next.

FIG. 5 illustrates a configuration example of a connection management table. The connection management table is a table for managing which one of the MFP module chip 520 and the Main CPU module chip 540 is set as a link-up target of the I/O module chip 570 when a device is connected to the image forming apparatus 1.

In the connection management table illustrated in FIG. 5, "communication standard" indicates standard information of devices. In this exemplary embodiment, the standard information indicates communication standards of devices.

Specifically, the "communication standard" indicates "USB1.0", "USB1.1", "USB2.0", "USB3.0", "USB3.1", and "USB3.2". The "communication standard" is the communication standard of a USB memory.

The "communication standard" also indicates "10BASE-T", "100BASE-TX", "1000BASE-T", and "10GBASE-T". The "communication standard" is the communication standard of a computer network. Specifically, the "communication standard" is Ethernet (registered trademark).

The "communication standard" further indicates "IEEE802.11a" and "IEEE802.11ac". The "communication standard" is the communication standard of a wireless local area network (LAN).

In addition, in the connection management table, "communication speed (Gbps)" indicates the maximum communication speed of a device corresponding to the "communication standard".

Furthermore, in the connection management table, "link-up target" indicates a target that is one of the MFP module chip 520 and the Main CPU module chip 540 to which the I/O module chip 570 is linked up.

The "link-up target" indicates "MFP CPU" and "Main CPU". The "MFP CPU" represents the MFP module chip 520. The "Main CPU" represents the Main CPU module chip 540.

In the connection management table according to this exemplary embodiment, a "communication standard" with a "communication speed (Gbps)" lower than 1 is associated with "MFP CPU" as the "link-up target". Specifically, "USB1.0", "USB1.1", "USB2.0", "10BASE-T", "100BASE-TX", and "IEEE802.11a" with "communication speeds (Gbps)" lower than 1 are associated with "MFP CPU".

In contrast, the "communication standard" with a "communication speed (Gbps)" of 1 or higher is associated with "Main CPU" as the "link-up target". Specifically, "USB3.0", "USB3.1", "USB3.2", "1000BASE-T", "10GBASE-T", and "IEEE802.11ac" with "communication speeds (Gbps)" of 1 or higher are associated with "Main CPU".

The connection management unit 576 also serves as a holding unit that holds standard information and connection target information in an associated manner.

The "communication standard" indicated in the connection management table in FIG. 5 is merely an example, and a "communication standard" that differs from the "communication standard" illustrated in FIG. 5 may be indicated in a manner associated with a "communication speed (Gbps)" and a "link-up target".

Flow of Processing that is Performed by Connection Management Unit

The flow of processing that is performed by the connection management unit 576 is described next.

Figure 6:
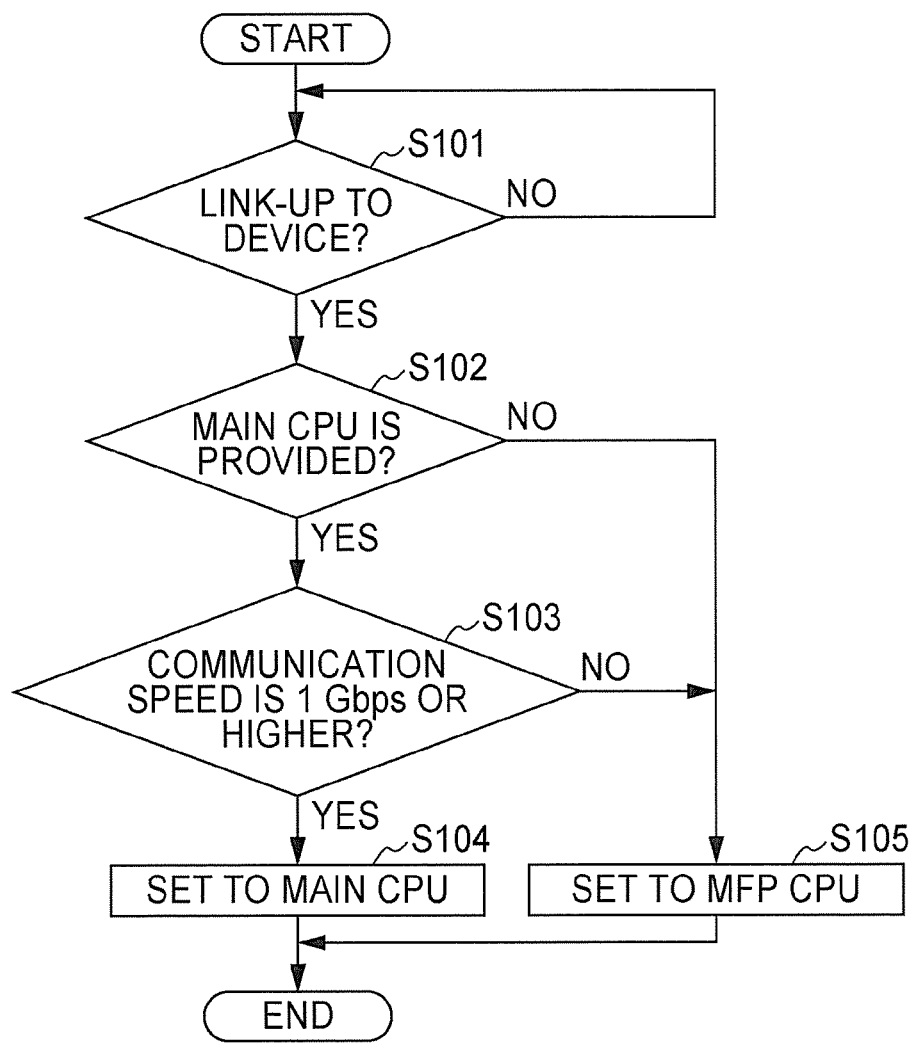
FIG. 6 is a flowchart illustrating a flow of processing that is performed by a connection management unit.

FIG. 6 is a flowchart illustrating the flow of the processing that is performed by the connection management unit 576.

The connection management unit 576 determines whether the I/O module chip 570 has been linked up to a device (S101). The determination whether the I/O module chip 570 has been linked up to a device is made by determining whether the connection management unit 576 has acquired connection information. While NO continues, the connection management unit 576 repeats the determination operation in S101.

In contrast, if the connection management unit 576 has acquired connection information, this represents YES, and the flow goes to step S102.

The connection management unit 576 determines whether the Mochi chip unit 510 is provided with the Main CPU module chip 540 (S102).

If YES in step S102, the connection management unit 576 determines whether the communication speed of the device to which the I/O module chip 570 is linked up is 1 Gbps or higher (S103). Specifically, the connection management unit 576 acquires standard information of the linked-up device. Then, the connection management unit 576 determines whether the communication speed associated with the acquired standard information in the connection management table (see FIG. 5) is 1 Gbps or higher.

If the communication speed is 1 Gbps or higher (YES in S103), the connection management unit 576 sets an integrated circuit to be linked up, to the Main CPU module chip 540 (S104).

In contrast, if NO in step S102 or S103, the connection management unit 576 sets an integrated circuit to be linked up, to the MFP module chip 520 (S105).

In this exemplary embodiment, when a device is connected to the I/O module chip 570, the connection management unit 576 sets the integrated circuit to be connected, in accordance with the communication speed of the connected device.

When the Main CPU 550 with a high processing speed is used for all the processing on the data acquired from the device connected to the image forming apparatus 1, the other processing such as that the Main CPU 550 causes the user interface 300 to display an image may be disturbed.

Thus, in this exemplary embodiment, the integrated circuit to be linked up is set to one of the MFP module chip 520 and the Main CPU module chip 540 in accordance with the communication speed of the device connected to the image forming apparatus 1.

In particular, in this exemplary embodiment, the connection management unit 576 sets the integrated circuit to be connected, to the MFP module chip 520 if a device with a communication speed lower than a first speed is connected to the I/O module chip 570, and sets the integrated circuit to be connected, to the Main CPU module chip 540 if a device with a communication speed of a second speed that is higher than the first speed is connected to the I/O module chip 570. The first speed is, for example, a communication speed of 1 Gbps. The second speed is, for example, a communication speed higher than 1 Gbps.

In this exemplary embodiment, when speed information relating to the device connected to the I/O module chip 570 is acquired, the connection management unit 576 sets connection to the integrated circuit specified from the circuit information associated with the acquired speed information and held in the connection management unit 576. In this exemplary embodiment, the speed information indicates information relating to the communication standard of a device.

In this exemplary embodiment, the connection management unit 576 sets the integrated circuit to be connected, to the Main CPU module chip 540 if a first device with a communication speed of a third speed is connected to the I/O module chip 570. The third speed is, for example, a communication speed of 1 Gbps. The period from when the first device transmits packeted data to when the I/O module chip 570 receives the data is shorter than the period from when the I/O module chip 570 receives the data to when the data is processed by the MFP CPU 527 and written in the SSD 580. In this case, the processing on data by the MFP CPU 527 is, for example, analysis of data.

Furthermore, in this exemplary embodiment, the period from when the I/O module chip 570 receives the packeted data to when the data is processed by the Main CPU 550 and written in the DRAM 590 is shorter than the period from when the first device transmits the data to when the I/O module chip 570 receives the data.

Reading of Image Data from Device to DRAM

Figure 7:
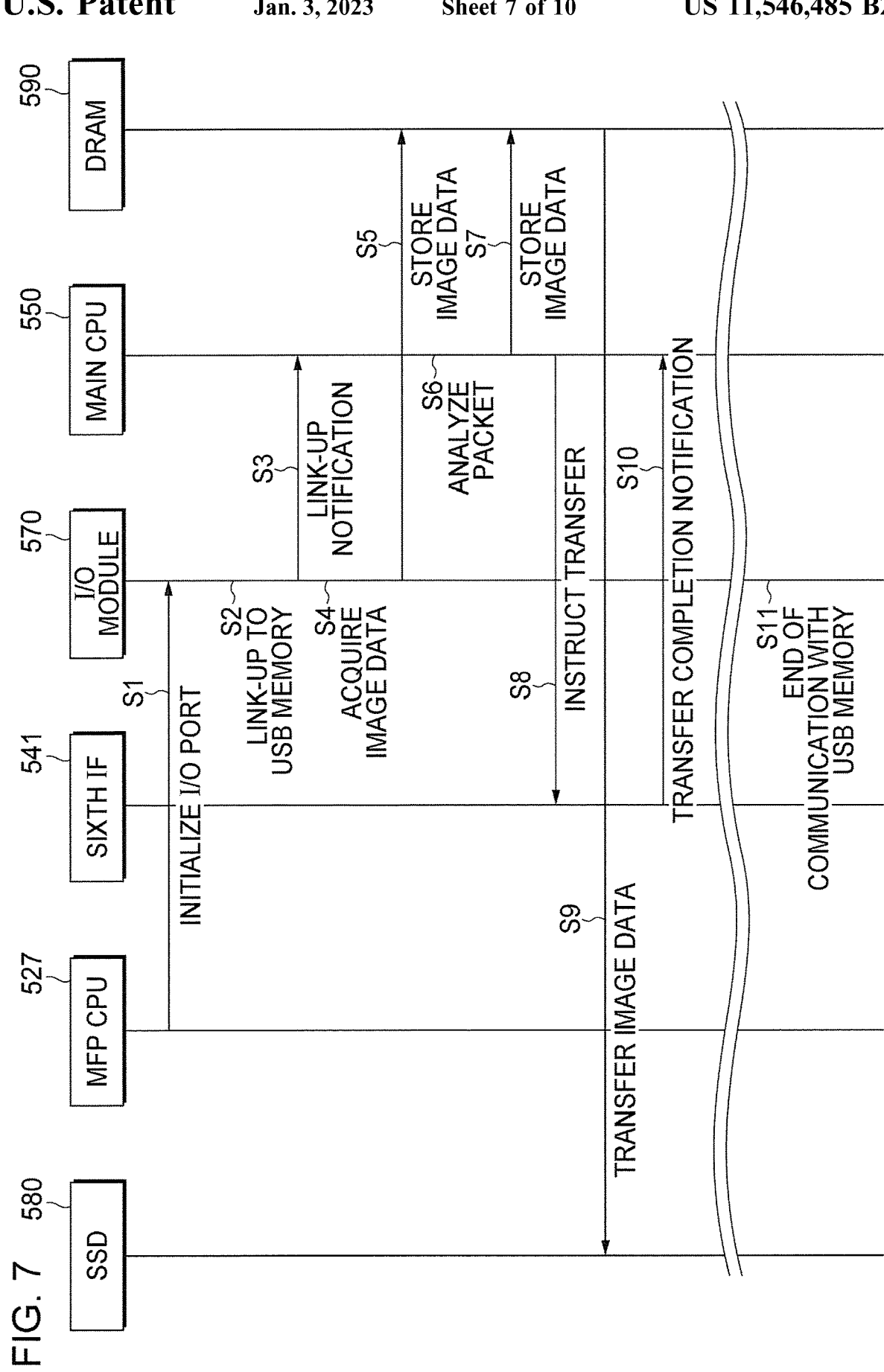
FIG. 7 is an explanatory view of processing operations that are executed when image data is read into a DRAM from a device that is linked up to an I/O module chip.
Figure 8:
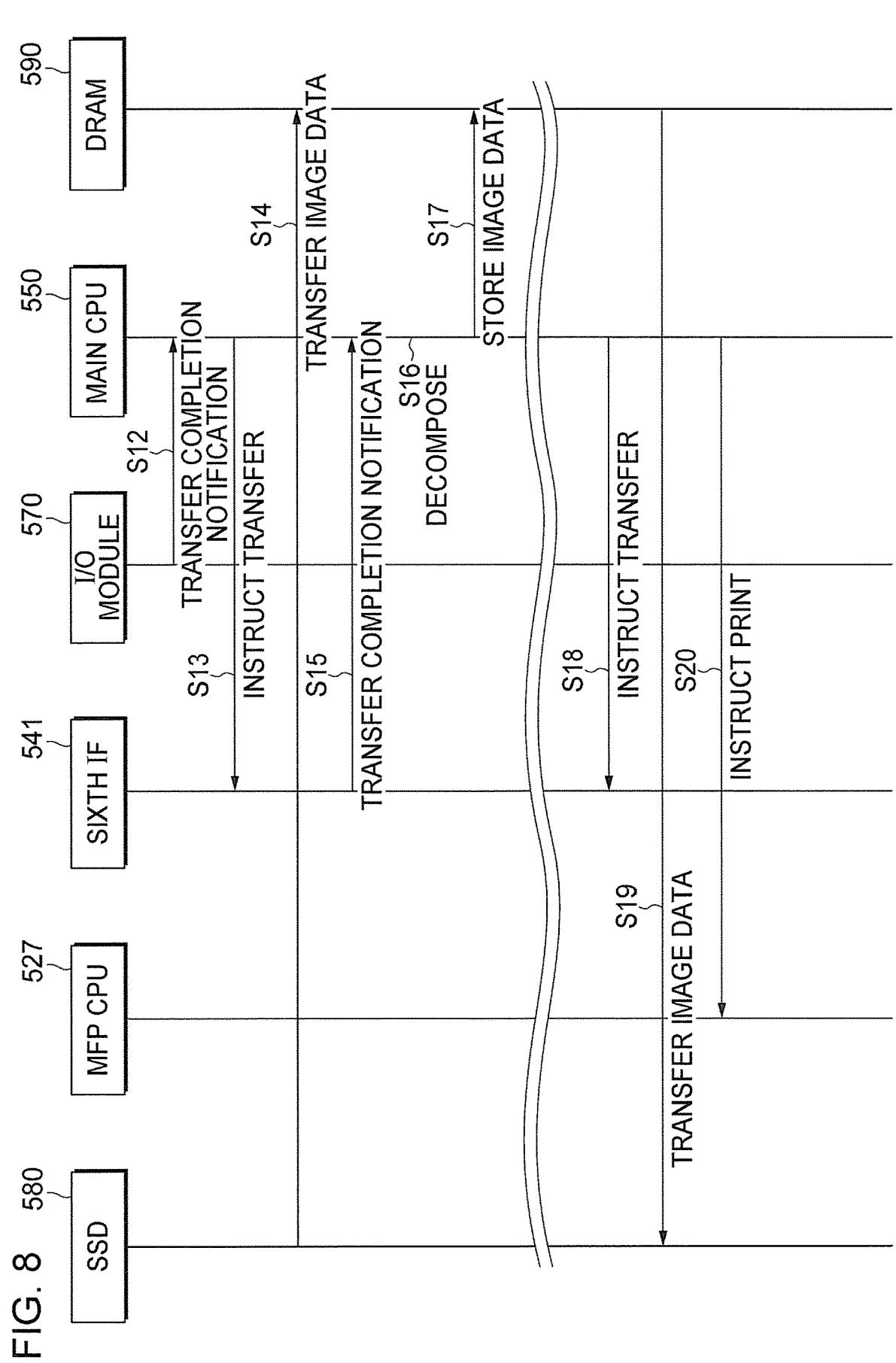
FIG. 8 is an explanatory view of the processing operations that are executed when the image data is read into the DRAM from the device that is linked up to an I/O module chip.

FIG. 7 and FIG. 8 are explanatory views of processing operations that are executed when image data is read into DRAM 590 from a device that is linked up to the I/O module chip 570. A case where the USB memory whose communication standard is "USB3.0" is linked up to the I/O module chip 570 is described below.

The MFP CPU 527 initializes the I/O port of the I/O module chip 570 (S1). Thus, when a device is connected to the image forming apparatus 1, the I/O module chip 570 is able to be linked up to the device. The initialization is performed, for example, when the power supply of the image forming apparatus 1 is turned on.

When a USB memory is connected to the image forming apparatus 1, the USB-memory interface unit 574 of the I/O module chip 570 is linked up to the connected USB memory (S2).

The connection management unit 576 acquires standard information of the USB memory from the USB-memory interface unit 574. The "communication speed (Gbps)" associated with the communication standard "USB3.0" in the connection management table (see FIG. 5) is "5", and the connection management unit 576 sets an integrated circuit to be linked up, to the Main CPU module chip 540.

The tenth Mochi interface module 572 of the I/O module chip 570 gives a link-up notification indicating execution of link-up to the Main CPU 550 (S3).

The USB-memory interface unit 574 of the I/O module chip 570 acquires image data from the USB memory (S4). The image data acquired at this time is first packet data among the plural packet data divided on a packet basis. That is, in this exemplary embodiment, image data is transferred on a packeted data basis from the linked-up USB memory.

The image data acquired by the USB-memory interface unit 574 is stored in the DRAM 590 (S5). When data is transferred from the I/O module chip 570 to the DRAM 590, the data is transferred to the Main CPU module chip 540 via the tenth Mochi interface module 572 and the eighth Mochi interface module 543. The data transferred to the Main CPU module chip 540 is stored in the DRAM 590 by the second memory controller 560.

The Main CPU 550 extracts and analyzes the image data stored in the DRAM 590 (S6). Specifically, the type of image data is specified, and converted into a file. The image data converted into a file is stored in the DRAM 590 again by the second memory controller 560 (S7).

The Main CPU 550 gives an instruction to transfer the image data stored in the DRAM 590 to the SSD 580, to the sixth Mochi interface module 541 (S8). The instruction of the transfer is an instruction of direct memory access (DMA) transfer without passing through the Main CPU 550.

The image data stored in the DRAM 590 is DMA transferred to the SSD 580 (S9). When the data stored in the DRAM 590 is transferred to the SSD 580, the data is transferred to the MFP module chip 520 via the sixth Mochi interface module 541 and the fourth Mochi interface module 524. The data transferred to the MFP module chip 520 is stored in the SSD 580 by the first memory controller 529.

When the image data is transferred to the sixth Mochi interface module 541, the sixth Mochi interface module 541 gives a transfer completion notification indicating completion of transfer of the image data, to the Main CPU 550 (S10).

Then, the processing from step S4 to step S10 is performed sequentially on the residual packet data.

The USB-memory interface unit 574 of the I/O module chip 570 ends the communication with the USB memory (S11).

The tenth Mochi interface module 572 of the I/O module chip 570 gives a transfer completion notification indicating completion of transfer of the image data from the USB memory, to the Main CPU 550 (S12).

The Main CPU 550 gives an instruction to DMA transfer the image data stored in the SSD 580 to the DRAM 590, to the sixth Mochi interface module 541 (S13).

The image data stored in the SSD 580 is DMA transferred to the DRAM 590 (S14). Specifically, plural packet data constituting the image data stored in the SSD 580 are DMA transferred to the DRAM 590. The transferred image data is stored in the DRAM 590 by the second memory controller 560.

When the image data is transferred to the sixth Mochi interface module 541, the sixth Mochi interface module 541 gives a transfer completion notification indicating completion of the transfer, to the Main CPU 550 (S15).

The Main CPU 550 extracts and decomposes the image data stored in the DRAM 590 (S16). The image data decomposed at this time is first packet data among the plural packet data.

The image data converted by decomposition is stored in the DRAM 590 by the second memory controller 560 (S17).

Then, the processing from step S16 and step S17 is performed sequentially on the residual packet data.

Then, the Main CPU 550 instructs the sixth Mochi interface module 541 about DMA transfer of the image data stored in the DRAM 590 to the SSD 580 (S18).

The image data stored in the DRAM 590 is transferred to the SSD 580 (S19). Specifically, plural packet data constituting the image data stored in the DRAM 590 are transferred to the SSD 580. The transferred image data is stored in the SSD 580 by the first memory controller 529.

Then, for example, when receiving an instruction of printing, the Main CPU 550 instructs the MFP CPU 527 to perform printing (S20). When receiving the instruction of printing, the MFP CPU 527 causes the image recording device 200 to form an image using the image data stored in the SSD 580.

Reading of Image Data from Device to SSD

Figure 9:
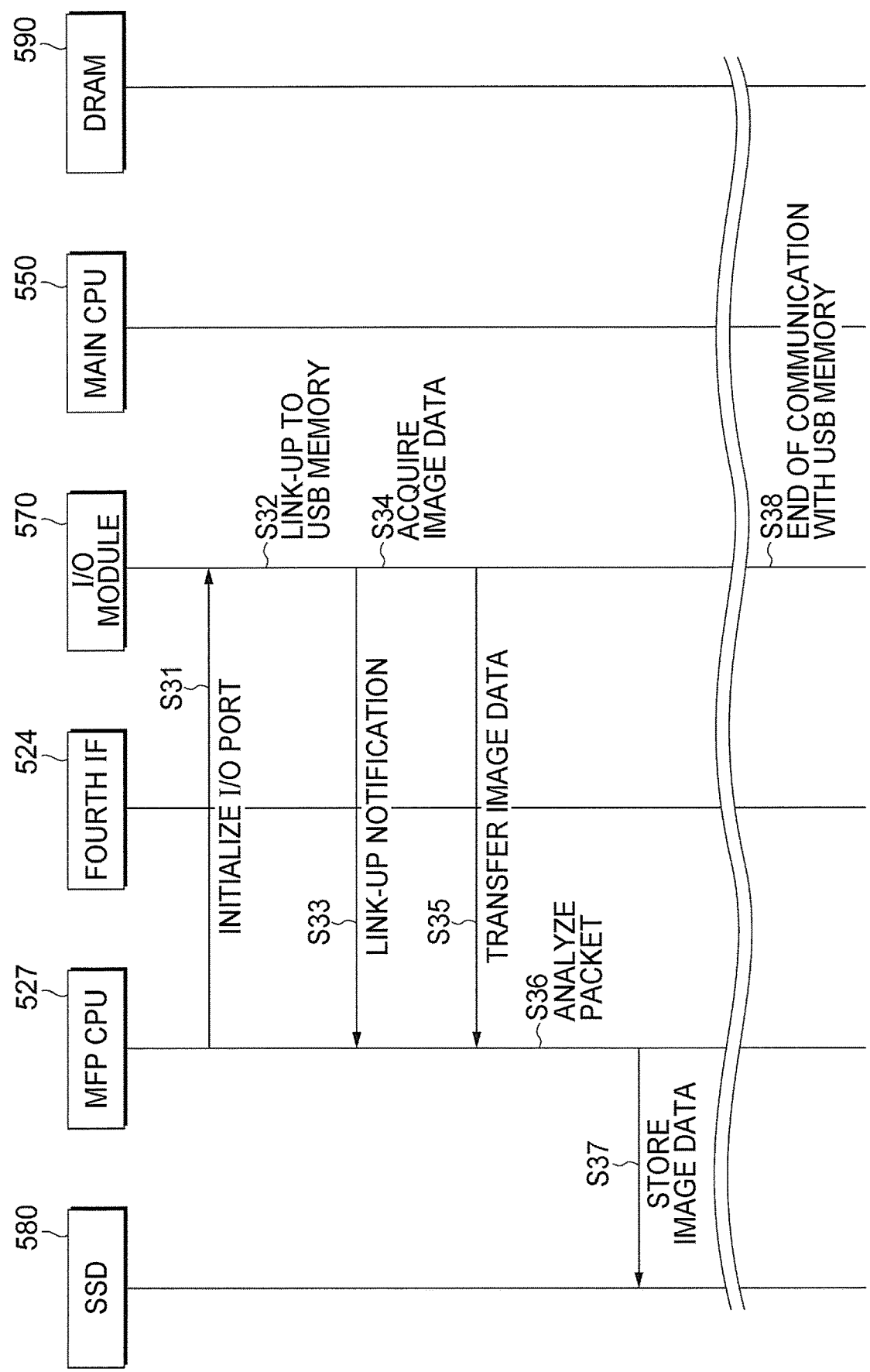
FIG. 9 is an explanatory view of processing operations that are executed when image data is read into an SSD from a device that is linked up to the I/O module chip.
Figure 10:
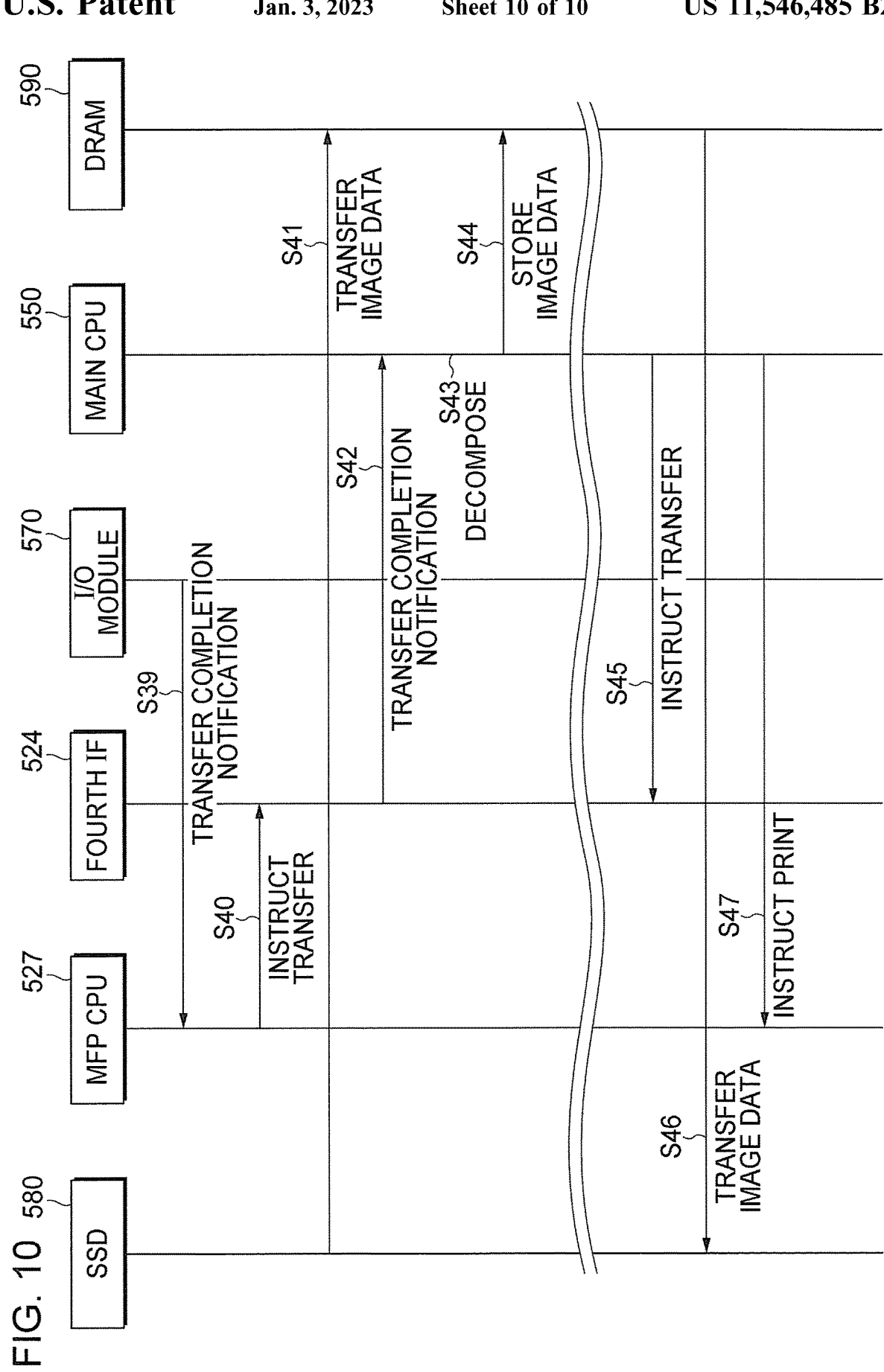
FIG. 10 is an explanatory view of the processing operations that are executed when the image data is read into the SSD from the device that is linked up to the I/O module chip.

FIG. 9 and FIG. 10 are explanatory views of processing operations that are executed when image data is read into SSD 580 from a device that is linked up to the I/O module chip 570. A case where the USB memory whose communication standard is "USB2.0" is linked up to the I/O module chip 570 is described below.

The MFP CPU 527 initializes the I/O port of the I/O module chip 570 (S31).

When a USB memory is connected to the image forming apparatus 1, the USB-memory interface unit 574 of the I/O module chip 570 is linked up to the connected USB memory (S32).

The connection management unit 576 acquires standard information of the USB memory from the USB-memory interface unit 574. The "communication speed (Gbps)" associated with the communication standard "USB2.0" in the connection management table (see FIG. 5) is "0.48", and the connection management unit 576 sets an integrated circuit to be linked up, to the MFP module chip 520.

The ninth Mochi interface module 571 of the I/O module chip 570 gives a link-up notification indicating execution of link-up, to the MFP CPU 527 (S33).

The USB-memory interface unit 574 of the I/O module chip 570 acquires image data from the USB memory (S34). The image data acquired at this time is first packet data among the plural packet data.

The image data acquired by the USB-memory interface unit 574 is transferred to the MFP CPU 527 (S35). When data is transferred from the I/O module chip 570 to the MFP CPU 527, the data is transferred to the MFP module chip 520 via the ninth Mochi interface module 571 and the fifth Mochi interface module 525. The data transferred to the MFP module chip 520 is stored in a static random access memory (SRAM) provided in the MFP CPU 527.

The MFP CPU 527 analyzes the acquired image data (S36).

The image data analyzed by the MFP CPU 527 is stored in the SSD 580 by the first memory controller 529 (S37).

Then, the processing from step S34 to step S37 is performed sequentially on the residual packet data.

The USB-memory interface unit 574 of the I/O module chip 570 ends the communication with the USB memory (S38).

The ninth Mochi interface module 571 of the I/O module chip 570 gives a transfer completion notification indicating completion of transfer of the image data from the USB memory, to the MFP CPU 527 (S39).

The MFP CPU 527 gives an instruction to DMA transfer the image data stored in the SSD 580 to the DRAM 590, to the fourth Mochi interface module 524 (S40).

The image data stored in the SSD 580 is DMA transferred to the DRAM 590 (S41). Specifically, plural packet data constituting the image data stored in the SSD 580 are DMA transferred to the DRAM 590. The transferred image data is stored in the DRAM 590 by the second memory controller 560.

When the image data is transferred to the fourth Mochi interface module 524, the fourth Mochi interface module 524 gives a transfer completion notification indicating completion of the transfer, to the Main CPU 550 (S42).

The Main CPU 550 extracts and decomposes the image data stored in the DRAM 590 (S43). The image data decomposed at this time is first packet data among the plural packet data.

The image data converted by decomposition is stored in the DRAM 590 by the second memory controller 560 (S44).

Then, the processing of step S43 and step S44 is performed sequentially on the residual packet data.

Then, the Main CPU 550 instructs the sixth Mochi interface module 541 about DMA transfer of the image data stored in the DRAM 590 to the SSD 580. The sixth Mochi interface module 541 instructs the fourth Mochi interface module 524 to DMA transfer the image data (S45).

The image data stored in the DRAM 590 is transferred to the SSD 580 (S46). Specifically, plural packet data constituting the image data stored in the DRAM 590 are transferred to the SSD 580.

Then, for example, when receiving an instruction of printing, the Main CPU 550 instructs the MFP CPU 527 to perform printing (S47). When receiving the instruction of printing, the MFP CPU 527 causes the image recording device 200 to form an image using the image data stored in the SSD 580.

In this exemplary embodiment, the connection management unit 576 sets the integrated circuit to be connected, to the MFP module chip 520 if a second device with a communication speed of a fourth speed is connected to the I/O module chip 570. In this case, the fourth speed is, for example, a communication speed lower than 1 Gbps. Thus, the MFP CPU 527 performs processing on a packet data basis. The processing by the MFP CPU 527 is, for example, analysis of data. Furthermore, the Main CPU 550 acquires image data processed by the MFP CPU 527, and performs processing of converting the image data into image data in a sheet output format.

That is, in this exemplary embodiment, even when the MFP CPU 527 analyzes image data, the Main CPU 550 decomposes the analyzed image data.

While the exemplary embodiment of the present disclosure is described above, the technical scope of the present disclosure is not limited to the scope described in the above-described exemplary embodiment. It is obvious from the description in the claims that the technical scope of the present disclosure includes a configuration obtained by modifying or improving the above-described exemplary embodiment in various ways.

For example, while the image reading device 100 and the image recording device 200 (including the control device 500) are integrated in the image forming apparatus 1 (see FIG. 1) according to this exemplary embodiment, the image reading device 100 and the image recording device 200 (see FIG. 1) may be housed in individual housings.

While the image forming apparatus 1 according to this exemplary embodiment expects an apparatus configuration that is used in an office or the like, an image forming apparatus for commercial use (production use) may be used.

While the MFP module chip 520, the Main CPU module chip 540, and the I/O module chip 570 are provided at the Mochi chip unit 510 according to this exemplary embodiment, another additional integrated circuit may be additionally provided at the Mochi chip unit 510.

While the case of the single layer structure of the cash memory in the Main CPU 550 (the GPU core 551C) and the case of the double layer structure (the first CPU core 551A and the second CPU core 551B) are described above according to this exemplary embodiment, the layer structure of the cash memory in either case is merely an example. For example, the layer structure of the cash memory may have three or more layers.

While this exemplary embodiment is constituted of the semiconductor chip not including a functional block that is not operated in an individual module, in other words, while this exemplary embodiment is constituted of a Mochi chip in which only functional blocks required for an operation are selectively combined, a semiconductor chip with another configuration may be employed. For example, a semiconductor chip having a series of functional blocks required for an operation as a system may be disposed on a semiconductor substrate.

The connection among the functional modules may employ a connection method other than the method using the Mochi interface modules.

While the common communication path serving as a communication path of data in the MFP module chip 520 is only the first internal bus 526 according to this exemplary embodiment, another communication path may be provided in addition to the first internal bus 526, as a common communication path. While the common communication path serving as a communication path of data in the Main CPU module chip 540 is only the second internal bus 544 according to this exemplary embodiment, another communication path may be provided in addition to the second internal bus 544, as a common communication path.

While, when acquiring the standard information of the device connected to the I/O module chip 570, the connection management unit 576 refers to the "communication speed (Gbps)" associated with the acquired standard information in the connection management table (see FIG. 5), it is not limited thereto.

For example, the connection management table may not indicate the information relating to the "communication speed (Gbps)". In this case, when the standard information of the device connected to the I/O module chip 570 is acquired, the connection management unit 576 may set link-up to the integrated circuit specified from the "link-up target" associated with the acquired standard information in the connection management table.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a first integrated circuit including a first controller that processes data acquired from a device and that controls an operation of the device;
a second integrated circuit including a second controller with a higher processing speed than a processing speed of the first controller; and
a third integrated circuit including a first connection unit connectable to the device,
wherein the third integrated circuit includes
a second connection unit connectable to the first integrated circuit,
a third connection unit connectable to the second integrated circuit, and
a setting unit that, when the device is connected to the first connection unit, sets an integrated circuit to be connected, in accordance with a communication speed of the connected device.

2. The information processing apparatus according to claim 1, wherein the setting unit sets an integrated circuit to be connected, to the first integrated circuit when a device with a communication speed lower than a first speed is connected to the first connection unit, and the setting unit sets an integrated circuit to be connected, to the second integrated circuit when a device with a communication speed of a second speed or higher is connected to the first connection unit, the second speed being higher than the first speed.

3. The information processing apparatus according to claim 2,
wherein the third integrated circuit further includes a holding unit that holds speed information relating to a communication speed of the device and circuit information relating to a connectable integrated circuit in an associated manner, and
wherein, when the setting unit acquires the speed information relating to the device connected to the first connection unit, the setting unit sets connection to an integrated circuit specified from the circuit information associated with the speed information and held in the holding unit.

4. The information processing apparatus according to claim 3, wherein the speed information is information relating to a standard of communication of the device.

5. The information processing apparatus according to claim 1, further comprising:
a first storage that stores data processed by the first controller,
wherein the first integrated circuit further includes a first writing unit that controls writing of data into the first storage,
wherein the setting unit sets an integrated circuit to be connected, to the second integrated circuit when a first device with a communication speed of a third speed is connected to the first connection unit,
wherein the third integrated circuit receives continuous data from the first device on a packeted data basis, and
wherein a period from when the first device transmits the packeted data to when the third integrated circuit receives the data is shorter than a period from when the third integrated circuit receives the data to when the data is processed by the first controller and written in the first storage.

6. The information processing apparatus according to claim 5, further comprising:
a second storage that stores data processed by the second controller,
wherein the second integrated circuit further includes a second writing unit that controls writing of data into the second storage, and
wherein a period from when the third integrated circuit receives the packeted data to when the data is processed by the second controller and written in the second storage is shorter than a period from when the first device transmits the data to when the third integrated circuit receives the data.

7. The information processing apparatus according to claim 1,
wherein the first integrated circuit further includes a fourth connection unit connectable to the second integrated circuit,
wherein the setting unit sets an integrated circuit to be connected, to the first integrated circuit when a second device with a communication speed of a fourth speed is connected to the first connection unit,
wherein the third integrated circuit receives image data from the second device on a packeted data basis,
wherein the first controller performs processing on the packeted data basis, and
wherein the second controller acquires the image data processed by the first controller, and performs processing of converting the image data into image data in a recording-medium output format.

8. A semiconductor device comprising:
a first integrated circuit including a first controller that processes data acquired from a device and that controls an operation of the device;
a second integrated circuit including a second controller with a higher processing speed than a processing speed of the first controller; and
a third integrated circuit including a first connection unit connectable to the device,
wherein the third integrated circuit includes
a second connection unit connectable to the first integrated circuit,
a third connection unit connectable to the second integrated circuit, and
a setting unit that, when the device is connected to the first connection unit, sets an integrated circuit to be connected, in accordance with a communication speed of the connected device.

9. The semiconductor device according to claim 8, wherein the setting unit sets an integrated circuit to be connected, to the first integrated circuit when a device with a communication speed lower than a first speed is connected to the first connection unit, and the setting unit sets an integrated circuit to be connected, to the second integrated circuit when a device with a communication speed of a second speed or higher is connected to the first connection unit, the second speed being higher than the first speed.

10. The semiconductor device according to claim 9,
wherein the third integrated circuit further includes a holding unit that holds speed information relating to a communication speed of a device and circuit information relating to a connectable integrated circuit in an associated manner, and
wherein, when the setting unit acquires the speed information relating to the device connected to the first connection unit, the setting unit sets connection to an integrated circuit specified from the circuit information associated with the speed information and held in the holding unit.

\* \* \* \* \*